G. H. ESTABROOKS.
PISTON PACKING RING.
APPLICATION FILED APR. 13, 1914.
1,103,573.
Patented July 14, 1914.
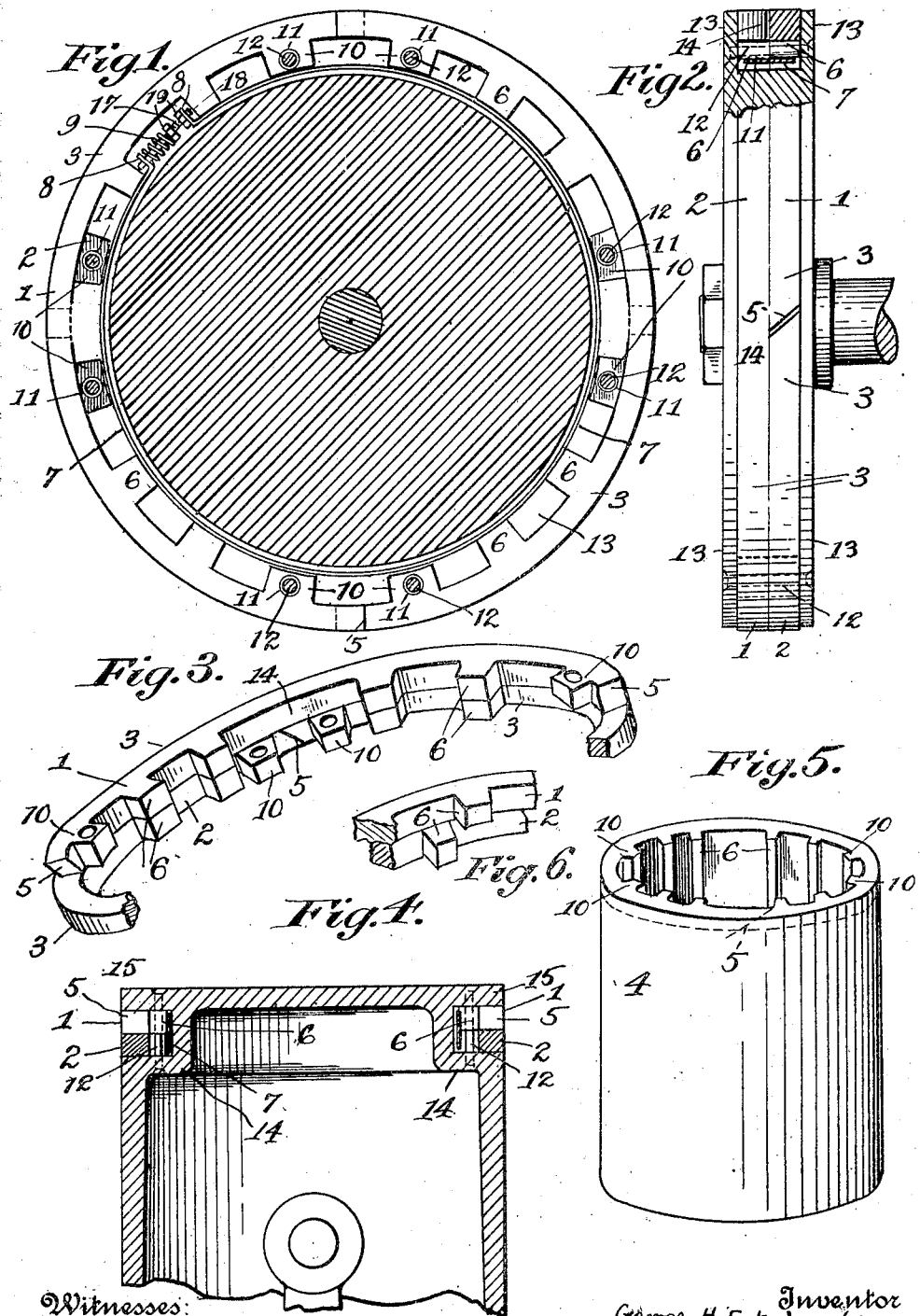

UNITED STATES PATENT OFFICE.

GEORGE H. ESTABROOKS, OF BROOKLYN, NEW YORK.

PISTON PACKING-RING.

1,103,573.

Specification of Letters Patent.  Patented July 14, 1914.

Application filed April 13, 1914. Serial No. 831,365.

*To all whom it may concern:*

Be it known that I, GEORGE H. ESTABROOKS, a citizen of the United States, residing at Brooklyn, in the county of Kings and State of New York, have invented certain new and useful Improvements in Piston Packing-Rings, of which the following is a specification.

This invention relates to an improvement in pistons, more particularly to packing rings for use with the pistons of steam or gas engines, pumps and the like, the object of the invention being to provide improved means for preventing the rotation of the ring relatively to the piston and also for preventing unnecessary friction between the ring and the cylinder in which the piston is operating, while providing improved means for imparting to the ring the proper amount of friction against such cylinder.

In piston packing rings as usually constructed the ring is either made in one heavy piece, which requires that a separate disk or follower forming one flange of the piston head be used so as to permit the placing of the ring on the piston, which disk or follower is usually secured in place by bolts passing through it and the opposite flange of the piston head and nuts threaded on such bolts on the outside of said opposite flange, or what is known as a snap ring is used, which ring is sprung in place between the flanges of the piston head, the ring being left free to rotate and to impinge on the cylinder with varying degrees of friction, and this friction varies considerably according to the amount of pressure exerted on the piston. In the first form of ring mentioned the nuts frequently work loose from the bolts and cause considerable trouble and injury both to the piston and cylinder, while in both forms thereof the ring is not only left free to rotate, whereby the ring is constantly moving to a new seat, thus causing unnecessary wear both on the ring and the cylinder, but under varying degrees of pressure exerted on the piston the amount of friction between the ring and the cylinder is also varied, which also causes unnecessary wear on the cylinder and ring.

The object, therefore, of the present invention is to provide an improved packing ring having improved means for preventing rotation thereof relatively to the piston and for also preventing unnecessary expansion of the ring, whereby said ring will quickly find a permanent seat on the inside of the cylinder and by means of which also the ring is permitted to expand bodily to take up the wear between it and the cylinder, while it is prevented from being forced with undue pressure against such cylinder, thereby materially prolonging the life both of the cylinder and ring.

In the drawings accompanying and forming part of this specification, Figure 1 is a cross sectional view through a piston with this improved packing ring in position thereon; Fig. 2 is a side view of the piston, partly broken away; Fig. 3 is a detail perspective view of three of the sections forming the ring, the two under sections being shown breaking joint about midway of the upper section and having their opposite ends broken away; Fig. 4 is a sectional view showing the improved ring applied to a hollow piston head; Fig. 5 is a perspective view showing the casting from which the ring is cut, the dotted lines indicating the manner of sawing the ring sections from such casting; and Fig. 6 is a detail perspective view showing portions of the ring sections with the lugs staggered.

Similar characters of reference indicate corresponding parts in the different figures of the drawings.

This improved packing ring, in the preferred form thereof, comprises two circular members or layers 1 and 2, each preferably divided into a pair of semi-circular sections 3, which are sawed from a casting 4, shown in Fig. 5, the casting having been first turned true inside and out. Each ring thus sawed from the casting is then sawed transversely to form the two semi-circular sections 3, each having its ends cut so as to form with the ends of an adjacent section diagonal joints running in opposite directions, as shown at 5, Figs. 2 and 3, and these semi-circular sections are interchangeable one with another and will fit in any position and with either face up. Each semi-circular ring section 3 is provided along the inner side thereof with a series of lugs 6 to provide a bearing for the band spring 7 which is placed between the arbor or hub of the piston head and the ring sections for the purpose of keeping said sections properly expanded against the cylinder wall, the ends of the band spring being bent or hooked as at 8, Fig. 1, to provide seats for the ends of a coil spring, or springs, 9 placed between such ends, and also to prevent the band spring from rotating with relation to the ring sections. The bent ends of the band spring, see Fig. 1, are spaced sufficiently beyond the adjacent lugs on the ring sections to permit the spring to properly expand. Each of the semi-circular ring sections 3 is also provided adjacent to each end thereof with a lug 10 having a perforation or slot 11 therein for the passage therethrough of a rivet 12, which is countersunk in the flanges 13 of the piston head, the slots 11 being somewhat larger than the rivets, thereby to permit the proper expansion of the ring sections but preventing unnecessary friction between the ring and the cylinder under heavy pressure, it being the purpose of this invention, after sufficient wear has taken place between the ring and cylinder to take up all of the space between the rivets 12 and the inner wall of the slots 11, to file or ream out these slots so as to permit further use of the ring sections, thereby greatly lengthening the life thereof. The four sections forming the ring are assembled in the piston head with their ends overlapping each other, that is the upper sections breaking joints with the lower sections, as shown at 14, Fig. 3.

It will be understood, of course, that while I have shown the lugs on the upper ring sections in register with those on the lower sections, this is not essential, but the lugs may be disposed at any convenient point along the inner side of the ring sections, provided only that the end lugs in each section, which are provided with the perforations 11 for the passage of the rivets, be placed out of register with any lug on an adjacent section.

In Fig. 4 I have shown my improved packing ring applied to a hollow piston, in which case the rivet passes through the end lug of each ring section in the manner hereinbefore described and is countersunk in the end flange 15 and the inwardly extending flange 16 of said hollow piston.

In practice, as hereinbefore stated, the bent ends of the band spring are spaced from the opposed or adjacent lugs so as to permit the spring to have a certain amount of expansion and thus effectively hold the packing ring in engagement with the cylinder wall. For the purpose of increasing the efficiency of the band spring and preventing the same from moving in and out when in use, that is to say to increase its expansive action, I have provided between the bent ends of the band spring one or more coil springs 9. That is to say, if the band spring is of a certain width a plurality of these coil springs may be located between the bent ends, one under the other, while in some cases but one of these coil springs need be used. By the provision of the coil spring or springs the expansive efficiency of the band spring is increased and any possible movement of the same between the lugs and the piston prevented.

It will, of course, be understood that the various details may be more or less modified without departing from the spirit and scope of the improvement. For instance, the number of lugs may be varied as occasion may require, according to the stiffness of the packing ring desired, and these lugs on the several layers of sections forming the ring may register or may be staggered, as shown for instance in Fig. 6, or otherwise arranged as may be preferred in practice.

In practice I provide a bolt 17 passing through the bent ends of the expanded or band spring and through the coil spring, and on the threaded portion 18 of this bolt is located a pair of nuts 19, and by adjusting which nuts the coil spring may be compressed thereby to increase the spring action of the expanded spring. By adjusting the nuts so as to permit the coil spring to expand the tension of the expanded spring may be decreased.

I claim as my invention:

1. A piston provided with a packing ring comprising a plurality of transversely divided sections, means at each end thereof for preventing the rotation of the section while permitting the expansion thereof equally from end to end and a band spring located between said sections and the piston for expanding said sections.

2. A piston provided with a packing ring comprising a plurality of transversely divided sections and means at each end thereof for preventing the rotation of the section while permitting the expansion thereof equally from end to end, said means comprising fastening means and slots of larger diameter than said fastening means.

3. A piston provided with a packing ring comprising a plurality of transversely divided sections, means at each end of each of said sections for preventing the rotation of the section while permitting the expansion thereof equally from end to end, and a single spring located between said sections and the piston for expanding said sections.

4. A piston provided with a packing ring comprising a pair of superimposed layers each divided transversely into a pair of sections, each of said sections having at its opposite ends means for preventing the rotation of the section while permitting the movement thereof equally from end to end thereof, and a spring for expanding all of said sections simultaneously.

5. A piston provided with a packing ring comprising a pair of superimposed layers each divided transversely into a pair of sections, each of said sections having at its opposite ends means for preventing the rotation of the section while permitting the movement thereof equally from end to end of said section, and a spring for expanding all of said sections simultaneously, each of said sections having inwardly extending lugs in engagement with said spring.

6. A piston provided with a packing ring comprising a pair of superimposed layers each divided transversely into a pair of sections, each of said sections having at its opposite ends means for preventing the rotation of the section while permitting the movement thereof equally from end to end of said section, and a spring for expanding all of said sections simultaneously, each of said sections having inwardly extending lugs in engagement with said spring, said spring having bent ends spaced apart from a pair of opposed lugs.

7. A piston provided with a packing ring comprising a plurality of sections each having a plurality of inwardly extending lugs, and an open-ended spring located around said piston and bearing against said lugs for expanding said sections, said spring having bent ends spaced from a pair of opposed lugs.

8. A piston provided with a packing ring comprising a plurality of sections each having a plurality of inwardly extending lugs, an open-ended spring located around said piston and bearing against said lugs for expanding said sections, said spring having bent ends spaced from a pair of opposed lugs, and means for preventing the rotation of said sections while permitting the movement thereof equally from end to end.

9. A piston provided with a packing ring comprising a plurality of transversely divided sections, and means for preventing the rotation of the sections while permitting the expansion thereof equally from end to end, said means comprising fastening means and slots of larger diameter than said fastening means.

10. A piston provided with a packing ring comprising a plurality of transversely divided sections, means for preventing the rotation of the sections while permitting the expansion thereof equally from end to end, and a band spring located between said sections and the piston for expanding said sections.

11. A piston provided with a packing ring comprising a pair of superimposed layers each divided transversely into a pair of sections, each of said sections having means for preventing the rotation of the section while permitting the movement thereof equally from end to end thereof, and a band spring for expanding all of said sections simultaneously.

12. A piston provided with a packing ring comprising a plurality of transversely divided sections, means for preventing the rotation of the sections while permitting the expansion thereof equally from end to end, a spring located between said sections and the piston for expanding said sections, and a coil spring for maintaining said first spring expanded.

13. A piston provided with a packing ring comprising a pair of superimposed layers each divided transversely into a pair of sections, each of said sections having means for preventing the rotation of the section while permitting the movement thereof equally from end to end thereof, a spring for expanding all of said sections simultaneously, and a coil spring for maintaining said first spring expanded.

14. A piston provided with a packing ring comprising a pair of superimposed layers each divided transversely into a pair of sections, each of said sections having at its opposite ends means for preventing the rotation of the section while permitting the movement thereof equally from end to end of said section, a spring for expanding all of said sections simultaneously, each of said sections having inwardly extendings lugs in engagement with said spring, said spring having bent ends spaced apart from a pair of opposed lugs, and a coil spring between said bent ends.

15. A piston provided with a packing ring comprising a plurality of sections each having a plurality of inwardly extending lugs, an open-ended spring located around said piston and bearing against said lugs for expanding said sections, said spring having bent ends spaced from a pair of opposed lugs, and a coil spring between said bent ends.

16. A piston provided with a packing ring comprising a plurality of transversely divided sections, means for preventing the rotation of said sections while permitting the expansion thereof equally from end to end, and a pair of differently formed springs for expanding said sections in their normal working position.

17. A piston provided with a packing ring comprising a plurality of transversely divided sections, means for preventing the rotation of said sections while permitting the expansion thereof equally from end to end, and a pair of differently formed springs for expanding said sections in their normal working position, one of said springs comprising a band spring and the other a coil spring.

18. A piston provided with a packing ring comprising a plurality of sections having inwardly extending lugs, a spring between said piston and lugs for expanding said sections, means for limiting the expansion of said sections, and a coil spring coöperating with said first spring for maintaining the latter expanded.

19. A piston provided with a packing ring comprising a plurality of sections each having a plurality of inwardly extending lugs, an open-ended spring located around said piston and bearing against said lugs for expanding said sections, means for preventing the rotation of said sections, and a coil spring coöperating with said first spring for maintaining the latter expanded.

20. A piston provided with a packing ring comprising a plurality of transversely divided sections, means for preventing the rotation of said sections while permitting the expansion thereof equally from end to end, means between said piston and ring for expanding said sections and including a coil spring, and means for increasing or decreasing the spring action of said coil spring.

21. A piston provided with a packing ring comprising a plurality of sections, means between said piston and sections for expanding the latter and including a coil spring, and means for increasing or decreasing the spring action of said coil spring.

22. A piston provided with a packing ring comprising a plurality of sections having inwardly extending lugs, and a band spring between said piston and lugs for expanding said sections, said spring bearing only upon said lugs.

23. A piston provided with a packing ring comprising a plurality of sections having inwardly extending lugs, a spring between said piston and lugs for expanding said sections, and means for limiting the expansion of said sections.

24. A piston provided with a packing ring comprising a plurality of sections each having a plurality of inwardly extending lugs, an open-ended spring located around said piston and bearing against said lugs for expanding said sections, and means for preventing the rotation of said sections.

25. A piston provided with a packing ring comprising a plurality of sections each having a plurality of inwardly extending lugs, an open-ended spring located around said piston and bearing against said lugs for expanding said sections, and means for preventing the rotation of said sections and for limiting the expansion thereof.

26. A piston provided with a packing ring comprising a plurality of sections each having a plurality of inwardly extending lugs, an open-ended spring located around said piston and bearing against said lugs for expanding said sections, and means for preventing the rotation of said sections and for limiting the expansion thereof, said means comprising perforated lugs adjacent to the ends of said sections and means secured to said piston and passing through the perforations in said lugs.

27. A piston packing ring comprising a plurality of sections provided with inwardly extending lugs, means for preventing the rotation of said sections, and means for limiting the expansion thereof.

Signed at New York, in the county of New York and State of New York, this 11th day of April, 1914.

GEORGE H. ESTABROOKS.

Witnesses:
F. E. BOYCE,
W. L. BAKELAR.